United States Patent [19]

Watanabe et al.

[11] Patent Number: 5,262,453
[45] Date of Patent: Nov. 16, 1993

[54] CUSHION OR TRACKBED MATERIAL FOR USE IN RIDING-GROUND

[75] Inventors: Yutaka Watanabe, Yokohama; Kazuo Aoyama, Kawasaki; Hisanobu Niwata, Sagamihara; Sumio Ikeda; Katuaki Ishikawa, both of Yokohama; Yoshiteru Kato, Kamakura, all of Japan

[73] Assignees: Nippon Oil Company, Limited; Nippon Petrochemicals Company, Limited; Nippon Hodo Company, Limited, all of Tokyo, Japan

[21] Appl. No.: 730,217

[22] Filed: Jul. 15, 1991

[30] Foreign Application Priority Data

Jul. 13, 1990 [JP] Japan .................. 2-184252

[51] Int. Cl.⁵ ............................. C08K 9/04
[52] U.S. Cl. .................. 523/209; 524/275; 524/277
[58] Field of Search ............ 523/209; 524/275, 277

[56] References Cited

U.S. PATENT DOCUMENTS

| | | | |
|---|---|---|---|
| 4,218,263 | 8/1980 | Kawabata et al. | 106/270 |
| 4,598,019 | 7/1986 | Yokoyama | 428/407 |
| 4,792,133 | 12/1988 | Hawkins et al. | 272/3 |
| 4,968,024 | 11/1990 | Hawkins | 272/3 |
| 5,041,320 | 8/1991 | Meredith et al. | 428/87 |

FOREIGN PATENT DOCUMENTS

| | | |
|---|---|---|
| 49-96094 | 9/1974 | Japan . |
| 50-89316 | 7/1975 | Japan . |
| 2-274905 | 11/1990 | Japan . |

*Primary Examiner*—Paul R. Michl
*Assistant Examiner*—John J. Guarriello
*Attorney, Agent, or Firm*—Scully, Scott, Murphy & Presser

[57] ABSTRACT

A cushion or trackbed material for use in a riding-ground is obtained by coating sand with a carboxyl-containing olefin polymer and an oxygen-containing wax.

9 Claims, No Drawings

CUSHION OR TRACKBED MATERIAL FOR USE IN RIDING-GROUND

The present invention relates to a cushion or trackbed material for use in a (horse) riding-ground and more particularly to a cushion or trackbed material suitable for sports facilities for race horse such as race dirt course.

Heretofore, in various riding-grounds such as race dirt courses, a trackbed (or loadbed) material and a cushion material are laid thereon uniformly using natural sand, etc.

In a riding-ground such as horse race track using natural sand, if the sand is used as a trackbed material there is obtained an appropriate supporting force, while if it is a cushion sand, there are obtained appropriate cushioning property and foothold. Therefore, a riding-ground using natural sand is preferred as a riding-ground suitable for horse exercise and it is well drained if only daily maintenance and management are performed to a satisfactory extent.

Usually, when a race dirt course is in a somewhat wet state, this state is regarded as being suitable for the exercise and running of horse. It is said that this state is attained at an optimum water content or thereabouts of natural sand used as a cushion material.

However, in a dry season such as the summer season wherein the atmospheric temperature rises, the water content of the cushion material becomes lower, resulting in that the foothold is poor, thus impairing smooth running of horse; besides, dust is blown up and impedes the sight of man and horse, thus causing an accident. In order to avoid these inconveniences it is required to sprinkle water.

Conversely, on a rainy day in the rainy season, the water content of the cushion material and that of trackbed material as a support layer become higher than necessary, with the result that in the cushion layer, muddy lumps are spattered with running of horse, thus impeding the sight of succeeding man and horse and causing an accident.

In a cold season, since gravitational water and adsorbed water between sand grains are frozen, not only the exercise of horse is impeded but also there is a danger of a violet fall, etc. and hence it is required to stop the horse exercise or race.

On the other hand, as a method for preventing dusting, freezing and mudding of a soil ground, there has been proposed a method wherein an asphalt emulsion or an oil such as a heavy oil is scattered or mixed into the soil. However, since this method is for a compacted soil, if it is applied to a cushion material and a trackbed material, using natural sand, there will arise such problems as deteriorated draining property, flowing-out of oil, emission of offensive smell, and concretion of sand in the cushion material. Thus, it is difficult to prevent dusting, freezing and mudding while maintaining the excellent characteristics of natural sand such as excellent cushioning and draining properties. Further, outflow or volatilization of oil due to rainfall not only reduces the dusting and freezing preventing effect but also causes oil to adhere to man and horse, buildings, etc. Thus, such conventional method is inferior in utilizability.

The object of the present invention resides in overcoming the above-mentioned drawbacks of the conventional riding-ground cushion and trackbed materials, particularly resides in providing all-weather type riding-ground cushion and trackbed materials which are not dependent on weather conditions with respect to their utilizability.

SUMMARY OF THE INVENTION

The present invention resides in a cushion or trackbed material for use in a riding-ground comprising sand coated with a coating material, the coating material comprising an olefin polymer having a carboxyl group or an anhydride group thereof and/or an oxygen-containing wax.

DETAILED DESCRIPTION OF THE INVENTION

The olefin polymer having a carboxyl group or an anhydride group thereof used in the present invention is not substantially limited if only it is a homopolymer or copolymer of olefin(s) having a carboxylic acid group or a carboxylic acid anhydride group. Preferred olefins are mono- or diolefins having 2 to 8 carbon atoms. For example, there may be used copolymers of one or more of olefins such as monoolefins, e.g. ethylene, propylene, butene, isobutene, hexene and cyclohexene, and diolefins, e.g. butadiene and isoprene, with unsaturated carboxylic acids or derivatives thereof. Examples of such copolymers also include graft polymers obtained by graft-polymerizing unsaturated carboxylic acids or derivatives thereof with olefin polymers. As examples of such graft polymers there are mentioned modified polyolefins obtained by graft-modifying polyolefins resulting from homo- or copolymerization of olefins such as monoolefins, e.g. ethylene, propylene, butene, isobutene, hexene and cyclohexene, or diolefins, e.g. butadiene and isoprene, with unsaturated carboxylic acids or derivatives thereof.

As preferred examples of such unsaturated carboxylic acids there are mentioned α,β-unsaturated mono- and dicarboxylic acids having 2 to 8 carbon atoms such as acrylic, maleic, fumaric, tetrahydrophthalic, itaconic, citraconic, crotonic and isocrotonic acids. Examples of their derivatives include acid halides, amides, imides, anhydrides, and esters. More concrete examples are malenyl chloride, maleimide, maleic anhydride, citraconic anhydride, monomethyl maleate, dimethyl maleate, and glycidyl maleate.

Preferred olefin polymers having a carboxyl group or an anhydride group thereof are modified polyolefins obtained by graft-modifying the foregoing polyolefins with unsaturated carboxylic acids or derivatives thereof. Above all, modified polyolefins obtained using alkenyl succinic anhydride are preferred.

The above modified polyolefins can be prepared by any of known methods, e.g. a method wherein unsaturated carboxylic acids or derivatives thereof are added to polyolefins and graft-copolymerized therewith. For efficient graft copolymerization of unsaturated carboxylic acids, it is desirable that the reaction be carried out in the presence of a radical initiator. Examples of radical initiators include organic peroxides and organic peresters such as benzoyl peroxide, dicumyl peroxide, di-tert-butyl peroxide, tert-butyl perbenzoate, cumyl perpivalate, and azo compounds, e.g. azobisisobutyronitrile.

In graft-modified polyolefins it is desirable that 0.05 to 5.0 moles, preferably 0.1 to 4.0 moles, on the average of unsaturated carboxylic acids or derivatives thereof be added to 1 mole of polyolefins.

As polyolefins employable in preparing the olefin polymer having a carboxyl group or an anhydride group thereof according to the present invention, polybutene and polyisobutylene are particularly preferred because they are easily available and also in view of the use and performance of the resulting product. The molecular weight of the starting polyolefin may be suitably selected according to the kind of olefin(s) used and for what purpose the resulting product is to be used. For example, in the case of polybutene, the molecular weight thereof is preferably in the range of 300 to 3000.

The details of how to prepare a graft-modified polyolefin are disclosed in Japanese Patent Laid Open No. 89316/1975, which is incorporated herein for reference.

As examples of the oxygen-containing wax used in the invention there are mentioned natural waxes such as carnauba wax, montan wax, rice bran wax, bees wax and Japan tallow, synthetic waxes such as microcrystalline wax oxide and paraffin oxides, secondary modified products obtained by various reactions of those waxes, polyvalent carboxylic acid-modified waxes obtained by an addition reaction of hydrocarbon waxes and unsaturated polyvalent carboxylic acids or anhydrides thereof, and mixtures thereof.

Preferred as the oxygen-containing wax used in the present invention is an oxygen-containing wax obtained by reacting 100 parts by weight of a hydrocarbon wax having a melting point in the range of 50° to 90° C. and 3-25 parts by weight of an unsaturated polyvalent carboxylic acid or an anhydride thereof. The details of how to prepare it is disclosed in Japanese Patent Laid Open No. 96094/1974, which is incorporated herein for reference. Further preferred as the oxygen-containing wax used in the present invention is an oxygen-containing wax obtained by mixing 10-80, preferably 30-70, parts by weight of a petroleum distillate wax having a melting point in the range of 50° to 85° C. with 90-20, preferably 70-30, parts by weight of a polyolefinic wax (II) having a melting point of 36° to 120° C., a number average molecular weight of 310 to 1,000 and 5 to 50 double bonds per 1,000 carbon atoms, and then reacting 100 parts by weight of the resulting mixture with 3-25, preferably 8-18, parts by weight of an unsaturated polyvalent carboxylic acid or an anhydride thereof. More concrete contents thereof are disclosed in Japanese Patent Laid Open No. 81306/1979, which is incorporated herein for reference.

As to the coating, material which constitutes the race tack cushion material and race trackbed material of the present invention, its optimum weight, etc. are determined according to purposes of use. The proportion of the coating material is usually in the range of 0.1 to 10 wt % based on a dry weight of sand. As to the composition of the coating material, the proportion of the olefin polymer having a carboxyl group or an anhydride group thereof is 100–0 wt % and that of the oxygen-containing wax is 0–100 wt %, preferably the polymer 95–50 wt % and the oxygen-containing wax 5–50 wt %.

Examples of the sand used in the present invention include natural sands such as river sand, mountain sand and sea sand, artificial sands such as crushed sand, as well as silica sand and granulated slag from blast furnace. No special limitation is placed thereon if only the required conditions are satisfied. In order to ensure the coating of sand grains with the coating material, it is desirable to use a dehydrated dry sand.

In the case of using sand as the cushion material of the invention, it is desirable that the sand pass 100% through a 2.36 mm sieve and be of a single grain size, while in the case of using sand as the trackbed material, it is desirable that the sand pass 100% through a 2.36 mm sieve and be of a continuous grain size.

The cushion material and the trackbed material can each be produced easily by mixing sand and the coating material. As the mixing method, there may be adopted, for example, plant mixing or site mixing. But, plant mixing is preferred in order to obtain homogeneous race track cushion material and trackbed material. Particularly, it is desirable that the mixing temperature be in the range of 100° to 180° C.

In the cushion material according to the present invention, the coating material having a specific composition exhibits a moderate viscosity and excellent coating forming property and water resistance, so it is possible to form a strong coating on each sand grain, whereby the coating material can be prevented from flowing out in a rainfall condition and the coated sand grains can be mutually bound temporarily to a moderate extent, and hence it is possible to suppress the formation of dust without sacrificing the excellent foothold and cushioning property of natural sand at an optimum water content thereof or thereabouts.

The trackbed material according to the present invention, which retains the same properties as those of the cushion material, can ensure a required supporting force.

Moreover, the cushion material and trackbed material of the present invention exhibits high water permeability, high draining property equal to or even higher than that of natural sand, and further exhibits a hydrophobic nature, so that gravitational water or adsorbed water is little retained between sand grains. Therefore, it is possible to suppress mudding and a freezing phenomenon of water, and coupled with the non-freezing property of the coating material, it is possible to prevent freezing of the cushion material. Further, since the trackbed material of the present invention has high draining property and hydrophobic nature, it can ensure a sufficient supporting force even in a rainfall condition. Besides, these effects can be ensured over a long period because the coating material superior in weathering resistance adheres strongly to the coating material, and such effects can be always exhibited constantly without deterioration even when the atmospheric temperature changes, because the coating material does not become brittle at low temperatures. Additionally, unlike such oils as heavy oils, the coating material is low in the intensity of smell and does not emit an offensive smell. Thus, a race dirt course or the like using the cushion material of the present invention can always maintain a good race track condition independently of weather conditions.

EXAMPLES

Examples of the present invention and comparative examples will be described below, but it is to be understood that the invention is not limited thereby.

EXAMPLE 1

Table-1 below shows properties of cushion sand, trackbed sand, alkenyl succinic anhydride (maleinated polybutene HVM-100, a product of Nippon Petrochemicals Co., Ltd.) and oxygen-containing wax (POWAX H-10, a product of Nippon Oil Co., Ltd.) which were used for preparing specimens. Test items and test results are as set forth in the same table.

TABLE 1

| Item | Measured Value | Sand Cushion | Trackbed | HVM-100 | H-10 |
|---|---|---|---|---|---|
| Percent Passing Weight (%) | 2.36 mm | 100 | 100 | | |
| | 0.6 | 61.8 | 65.5 | | |
| | 0.3 | 20.6 | 30.0 | — | — |
| | 0.15 | 3.6 | 6.6 | | |
| | 0.075 | 0.1 | 0.6 | | |
| Specific Gravity | Dry surface | 2.641 | 2.578 | | |
| | Bulk | 2.621 | 2.609 | — | — |
| | Apparent | 2.674 | 2.662 | | |
| Water Absorption (%) | | 0.75 | 1.22 | | |
| Acid Value (mgKOH/g) | | — | — | 47 | 55 |
| Kinematic Viscosity (cSt @ 100° C.) | | — | — | 654 | — |
| Melting Point (°C.) | | — | — | — | 69 |

(1) Waterproofness Test (About 300 ml of distilled water or tap water is poured into a beaker, then the temperature is adjusted to 50° C., and 20 g of each sample is placed therein, followed by heating for 60 seconds, thereafter whether the coating material is floating on the water surface is checked.) Compositions and test results are as shown in Table-2 below.

TABLE 2

| Composition | 1 | 2 | 3 |
|---|---|---|---|
| Natural Sand | 100 | 100 | 100 |
| HVM-100 | | 1.2 | 0.9 |
| H-10 | 1.2 | | 0.3 |
| Observation | Floating of the coating material is not observed. | Floating of the coating material is not observed. | Floating of the coating material is not observed. |

(2) Water Permeation Test (Cushion sand and trackbed sand are mixed with coating materials followed by compacting and specimens thus obtained are subjected to a water permeation test according to water permeation test defined by JIS A 1200.) The results obtained are as shown in Table-3.

TABLE 3

| Material | | Composition | | Permeation Coefficient cm/sec |
|---|---|---|---|---|
| Cushion Sand | present invention | Natural sand | 100 | |
| | | HVM-100 | 0.65 | $1.21 \times 10^{-2}$ |
| | | H-10 | 0.25 | |
| | conventional cushion sand | Natural sand | 100 | $1.11 \times 10^{-2}$ |
| Trackbed Sand | present invention | Natural sand | 100 | |
| | | HVM-100 | 0.9 | |
| | | H-10 | 0.3 | $1.05 \times 10^{-2}$ |
| | conventional cushion sand | Natural sand | 100 | $1.05 \times 10^{-2}$ |

(3) Freezing Test ①

(Cushion sand and trackbed sand are mixed with coating materials followed by compacting and specimens thus obtained are immersed in water for 24 hours, then are allowed to drain for 1 hour, and after standing 24 hours at −20° C. there is conducted a proctor needle test.) The results obtained are as shown in Table-4 below.

TABLE 4

| Material | | Proctor Needle Value | Touched Condition |
|---|---|---|---|
| Cushion Sand | present invention | 15 kg | The surface is loosened easily by hand. |
| | conventional cushion sand | 1100 kg | completely frozen like ice. |
| Trackbed Sand | present invention | 80 kg | The surface is loosened easily by hand. |
| | conventional cushion sand | 1250 kg | completely frozen like ice. |

As is apparent from Table-4, the mixtures with the coating materials incorporated therein are 1.4% and 6.4% in terms of proctor needle values and thus are little frozen, and their hardness is an easily loosened hardness with a finger tip.

(4) Freezing Test ②

(Cushion sand and trackbed sand are mixed with coating materials followed by compacting, then water is sprinkled over the upper surfaces of specimens thus obtained and thereafter draining was made for 1 hour. Then, after standing 24 hours at −20° C., there is conducted a needle test). The results obtained are as shown in Table-5 below.

TABLE 5

| Material | | Proctor Needle Value | Touched Condition |
|---|---|---|---|
| Cushion Sand | present invention | 8 kg | The surface is loosened easily by hand. |
| | conventional cushion sand | 1200 kg | completely frozen like ice. |
| Trackbed Sand | present invention | 10 kg | The surface is loosened easily by hand. |
| | conventional cushion sand | 1200 kg | completely frozen like ice. |

As is apparent from Table-5, the mixtures with the coating materials incorporated therein are 0.6% and 0.8% in terms of proctor needle values and thus are little frozen, and their surfaces are easily loosened with a finger tip.

(5) Test of Change in Water Content (Cushion sand is mixed with coating materials followed by compacting, then specimens thus obtained are immersed in water, and water contents are determined at various draining times.) The results obtained are as shown in Table-6 below.

TABLE 6

| Composition | | 1 | 2 | 3 | 4 |
|---|---|---|---|---|---|
| Natural Sand | | 100 | 100 | 100 | 100 |
| HVM-100 | | — | 0.9 | 0.65 | — |
| H-10 | | 0.9 | — | 0.25 | — |
| Change in Water Content (%) | 0 hr | 14.4 | 25.7 | 17.6 | 34.7 |
| | 0.5 hr | 12.8 | 25.4 | 15.6 | 34.3 |
| | 1.0 hr | 11.9 | 25.0 | 14.7 | 33.7 |
| | 2.0 hr | 10.8 | 23.9 | 12.1 | 33.7 |

As is apparent from Table-6, the mixtures with the coating materials incorporated therein are better drained than natural sand alone, and the mixtures containing H-10 (oxygen-containing wax) are still better drained.)

(6) Surface Hardness Test

Proctor needle test was conducted with respect to samples obtained by mixing sands with coating materials. The results obtained are as shown in Table-7 below.

TABLE 7

| Material | | Proctor Needle Value | Touched Condition |
|---|---|---|---|
| Cushion Sand | present invention | 3.5 kg | Somewhat viscous and is loosened easily with a finger tip. |
| | conventional cushion sand | 4.5 kg (optimum water content) | Somewhat compact, but is loosened easily with a finger tip. |
| Trackbed Sand | present invention | 5.5 kg | Somewhat viscous and is loosened easily with a finger tip. |
| | conventional cushion sand | 7.5 kg (optimum water content) | Somewhat compact, but is loosened easily with a finger tip. |

The proctor needle value of the conventional sand is 4.5 kg at an optimum water content, while in a dry condition it is unmeasurable. The cushion material of the present invention corresponds to a natural sand which is in a somewhat wet state, and its proctor needle is by no means inferior to that of the natural sand. A similar tendency is observed also with respect to the trackbed material.

(7) Determination of Smell

Smell was determined with respect to a sample obtained by mixing sand with a coating material. The results obtained are as shown in Table-8 below.

TABLE 8

| Material | | Smell | Remarks |
|---|---|---|---|
| Cushion Sand | present invention | 246 | Usually, assuming that the smell value of air is 200, that of coffee just after milling is 400 or so. |
| | conventional cushion sand | 200 | |

Although the smell value of the sample obtained according to the present invention is a little larger than that of the conventional cushion sand, it is substantially odorless, free of any offensive smell induced by oil, etc.

(8) Test of Supporting Force

A trackbed material obtained by mixing natural sand with a coating material according to the present invention and a conventional trackbed material of natural sand were tested for supporting force after sprinkling of water. The results obtained are as shown in Table-9 below.

TABLE 9

| Material | Proctor Needle Value (kg) |
|---|---|
| Present invention | 39 |
| Conventional Trackbed Material | 31 |

As is apparent from Table-9, the trackbed material containing the coating material is little deteriorated in supporting force.

EXAMPLE 2

An in-situ comparison was made between a race track cushion material and a trackbed material both according to the present invention and conventional cushion sand and trackbed sand. The materials and proportions thereof used are the same as in Example 1 (Table-3). The cushion material and the race trackbed material were obtained by wet-mixing 130° C. heat-dried sand with HVM-100 and H-10 for 50 seconds, using an asphalt plant.

The cushion material and trackbed material thus obtained and natural sand in a wet condition were laid uniformly at a predetermined thickness on a riding-ground using an asphalt finisher. Thereafter, comparative tests were conducted to check the following items with respect to their performance in one cold season. The results obtained are as set forth in Table-10.

(1) Running Performance and Dust-proofness

Gallop of horse was performed in a race track and the running performance, scattering of sand grains and dusting were observed visually. Between the natural sand in a wet condition and the cushion material and trackbed material according to the present invention there was no difference in running performance and dust-proofness, and the rack track was held in a good condition. However, when the natural sand was in a dry condition, the foothold was a little inferior and dusting was observed.

(2) Draining Property and Outflow of Coating Material

Water was sprinkled over the race track at a rate of 50 mm/hr and draining property was tested. As a result, all of the samples proved to have a satisfactory draining property without causing any inconvenience such as the stagnation of water on the surface. From the cushion material of the present invention there was observed no outflow of the coating material base on the sprinkling of water.

After the sprinkling of water, the water contents of the race trackbeds were determined, which were found to be 16.5% and 7.3% in the cases of the natural sand and the trackbed material of the present invention, respectively. The trackbed material of the present invention was smaller in the amount of water retained therein than in the natural sand, and exhibited little deterioration in its supporting force.

(3) Non-Freezing Property

On the day after the confirmation of draining property using sprinkled water, the minimum atmospheric temperature was −5.8° C., and a non-freezing property was observed by touching. The cushion material of the present invention had an easily loosened hardness with a finger tip, and a good ground condition was maintained, while the natural sand was completely frozen like ice.

TABLE 10

| | Present | Conventional Cushion Sand |
|---|---|---|
| Running Performance | Good | Good (in a wet state) Bad (in a dry state) |
| Dust-proofness | No dusting | No dusting (in a wet state) dusting (in a dry state) |
| Draining Property | Good | Good |
| Non-Freezing Property | No freezing | Freezes |

TABLE 10-continued

|  | Present | Conventional Cushion Sand |
|---|---|---|
| Outflow of Coating Material | None | — |

What is claimed is:

1. A cushion or trackbed material for use in a riding-ground consisting essentially of sand coated with an olefin polymer having a carboxyl group or an anhydride group thereof and an oxygen-containing wax wherein the coating material comprises 9%–50% by weight of said olefin polymer and 5–50% by weight of said oxygen-containing wax.

2. A cushion or tracked material as set forth in claim 1, wherein said olefin polymer is a copolymer of at least one member selected from mono- and diolefins having 2 to 8 carbon atoms with an unsaturated carboxylic acid having 2 to 8 carbon atoms or a functional derivative thereof.

3. A cushion or trackbed material as set forth in claim 2, wherein said unsaturated carboxylic acid is an $\alpha,\beta$-unsaturated mono- or dicarboxylic acid selected from acrylic, maleic, fumaric, tetrahydrophthalic, itaconic, citraconic, crotonic and isocrotonic acids.

4. A cushion or trackbed material as set forth in claim 2, wherein said copolymer is a modified polyolefin obtained by graft-modifying an olefin polymer with an unsaturated carboxylic acid or a derivative thereof.

5. A cushion or trackbed material as set forth in claim 4, wherein said modified polyolefin is an alkenyl succinic anhydride-modified polyolefin.

6. A cushion or trackbed material as set forth in claim 4, wherein said graft-modified polyolefin is a modified polyolefin obtained by adding 0.05 to 5.0 moles on the average of the unsaturated carboxylic acid or the derivative thereof to 1 mole of the polyolefin.

7. A cushion or trackbed material as set forth in claim 4, wherein the polyolefin is polybutene or polyisobutylene.

8. A cushion or trackbed material as set forth in claim 1, wherein said oxygen-containing wax is selected from the group consisting of carnauba wax, montan wax, rice bran wax, bees wax, Japan tallow, microcrystalline wax oxide, paraffin oxides, and secondary modified products thereof, as well as polyvalent carboxylic acid-modified waxes obtained by an addition reaction of hydrocarbon waxes and unsaturated polyvalent carboxylic acids or anhydrides thereof, and mixtures thereof.

9. A cushion or trackbed material as set forth in claim 1, wherein said oxygen-containing wax is prepared by mixing 10–80 parts by weight of a petroleum distillate wax having a melting point in the range of 50° to 85° C. with 90–20 parts by weight of a polyolefinic wax (II) having a melting point of 36° to 120° C., a number average molecular weight of 310 to 1,000 and 5 to 50 double bonds per 1,000 carbon atoms, and then reacting 100 parts by weight of the resulting mixture with 3–25 parts by weight of an unsaturated polyvalent carboxylic acid or an anhydride thereof under free radical purifying conditions.

* * * * *